United States Patent [19]

Kumakura

[11] Patent Number: 4,908,552
[45] Date of Patent: Mar. 13, 1990

[54] ELECTRONIC FLASH UNIT

[75] Inventor: Toshiyuki Kumakura, Kanagawa, Japan

[73] Assignee: Canon Kabushiki Kaisha, Tokyo, Japan

[21] Appl. No.: 282,872

[22] Filed: Dec. 9, 1988

Related U.S. Application Data

[63] Continuation of Ser. No. 62,934, Jun. 16, 1987, abandoned.

[30] Foreign Application Priority Data

Jun. 27, 1986 [JP] Japan .................. 61-150728
Jun. 27, 1986 [JP] Japan .................. 61-150729

[51] Int. Cl.⁴ ............... H05B 37/00; G03B 15/05
[52] U.S. Cl. ............... 315/241 P; 315/120; 315/129; 315/240; 315/178; 354/145.1
[58] Field of Search ............ 315/241 R, 241 P, 119, 315/120, 129, 240, 178; 354/145.1

[56] References Cited

U.S. PATENT DOCUMENTS

| | | | |
|---|---|---|---|
| 4,201,463 | 5/1980 | Harigaya et al. | 354/86 |
| 4,261,658 | 4/1981 | Uchiyama et al. | 354/126 |
| 4,270,079 | 5/1981 | Ikawa | 315/241 P |
| 4,273,432 | 6/1981 | Matsuda et al. | 354/145 |
| 4,306,281 | 12/1981 | Okino | 363/18 |
| 4,390,261 | 6/1983 | Yamamoto et al. | 354/173 |
| 4,393,335 | 7/1983 | Hirata et al. | 315/241 P |
| 4,512,644 | 4/1985 | Yoshida | 354/149.1 |
| 4,515,453 | 5/1985 | Wakabayashi et al. | 354/149.1 |
| 4,615,599 | 10/1986 | Kataoka et al. | 354/149.1 |
| 4,628,229 | 12/1986 | Inoue | 315/241 P |

OTHER PUBLICATIONS

U.S. Patent Appln. Serial No. 761,194 in the name of Hiroyuki Kataoka, et al., filed Jul. 31, 1985, entitled "Flash Photographing Apparatus".

Primary Examiner—James J. Groody
Assistant Examiner—Mark R. Powell
Attorney, Agent, or Firm—Robin, Blecker & Daley

[57] ABSTRACT

This invention concerns with an electronic flash unit in which, as two capacitors of large and small capacitances are charged, even when a trigger operation is actuated before the capacitor of large capacitance is fully charged, it is made possible with the help of the charge from the capacitor of small capacitance to fire the flash tube. Particularly in application of the invention to the above-described type of electronic flash unit, as the battery for use in charging the capacitors also serves to drive another load for a time which can fall in coincidence with the period of charging the capacitors, when the driving of the load is started, the charging of the capacitor of large capacitance is inhibited while the charging of the capacitor of small capacitance is permitted to go on, thereby it being made possible to carry out the driving of the load with high reliability so that the correct flash exposure is made while still maintaining the quickness of snap shots.

9 Claims, 3 Drawing Sheets

ELECTRONIC FLASH UNIT

This application is a continuation, of application Ser. No. 062,934, filed 6/16/87 now abandoned.

BACKGROUND OF THE INVENTION

1. Field of the Invention

This invention relates to an electronic flash unit having two capacitors of small and large capacitances for storing charges to fire a flash tube and using an electrical power source for supplying voltage to charge these capacitors in common as the drive electrical power source for another load, and a camera system using the same.

2. Description of the Related Art

In has already been known to provide an electronic flash unit in which besides the usual storage capacitor of large capacitance, there is further provided a second storage capacitor of small capacitance, too, arranged to be first charged so that even before the first capacitor of large capacitance is fully charged, as the capacitance of the second capacitor is so small that its charging is instantaneously completed, it is made possible to insure that for snap shots, a stable operation of the camera goes along, when the voltage stored on the second capacitor is used as the trigger, as disclosed in Japanese Laid-Open Patent Application No. Sho 58-97035.

Also, in recent years, what is formed by introducing into the electronic flash unit a load which is operated by the common electrical power source of these capacitors and is liable to fall in malfunctions when the voltage of the electrical power source drops below a certain level, is realized to an article of commodity. As an example of such load mention may be made of a light-emitting diode (LED) constituting part of the auto-focus device using its light as the auxiliary light. Though the above-described LED may be the generally available one, the required brilliance of the LED is considerably high. For this purpose, the current necessary to drive the LED must be increased to as high as several hundreds of milliamperes. To allow for maintaining this current flow at such an high intensity, its forward voltage should be made to lie as high as 3 volts or thereabout. As the above-described first capacitor is used in combination with a voltage booster or DC/DC converter, when the first capacitor is being charged, the battery voltage is caused to fall considerably. If an event that the command for energizing the above described LED of the AF device is given from the camera to the flash unit coincides with the charging of the first capacitor, therefore, a problem will often be encountered that the LED cannot emit as intense light as is desired.

Another example of the load is an electric motor for moving a Fresnel lens in order to alter the angular coverage of illumination of the projected flash light. To assure production of the driving torque from the motor, the voltage applied across the ends of winding of the motor must be sufficiently high. Or otherwise, a faulty operation would often result. To avoid this, therefore, similarly to the case of the LED, the time for which the motor is energized must be displaced from that for charging the first capacitor. Thus, the problem arises that the quickness of snap shots is sacrificed.

SUMMARY OF THE INVENTION

One aspect of the application is to eliminate the above-described problem and to provide an electronic flash unit which can afford the quickness of snap shots in such a way that a good stability of operation of the load using the common electrical power source of the storage capacitor can be assured.

Another aspect of the application is to provide an electronic flash unit having a first capacitor of small capacitance and a second capacitor of large capacitance arranged so that the charges stored on the first and second capacitors both are applied to a flash tube when it is fired to emit flash light, in which, for the battery as the electrical power source for charging both of the above-described two capacitors also serves as a source for driving another load, the charging of the second capacitor is prohibited during the supply of electrical power to that load, thereby giving an advantage that even though the common battery is used for charging the capacitors and driving the load, it is made possible to perform stable driving the load and to fire the flash discharge tube without delay, and a camera system using the same.

Other objects of the invention will become apparent from the following description of embodiments thereof by using the drawings.

DETAILED DESCRIPTION OF THE PREFERRED EMBODIMENTS

The present invention next is described in detail on the basis of illustrated embodiments.

Figure 1:
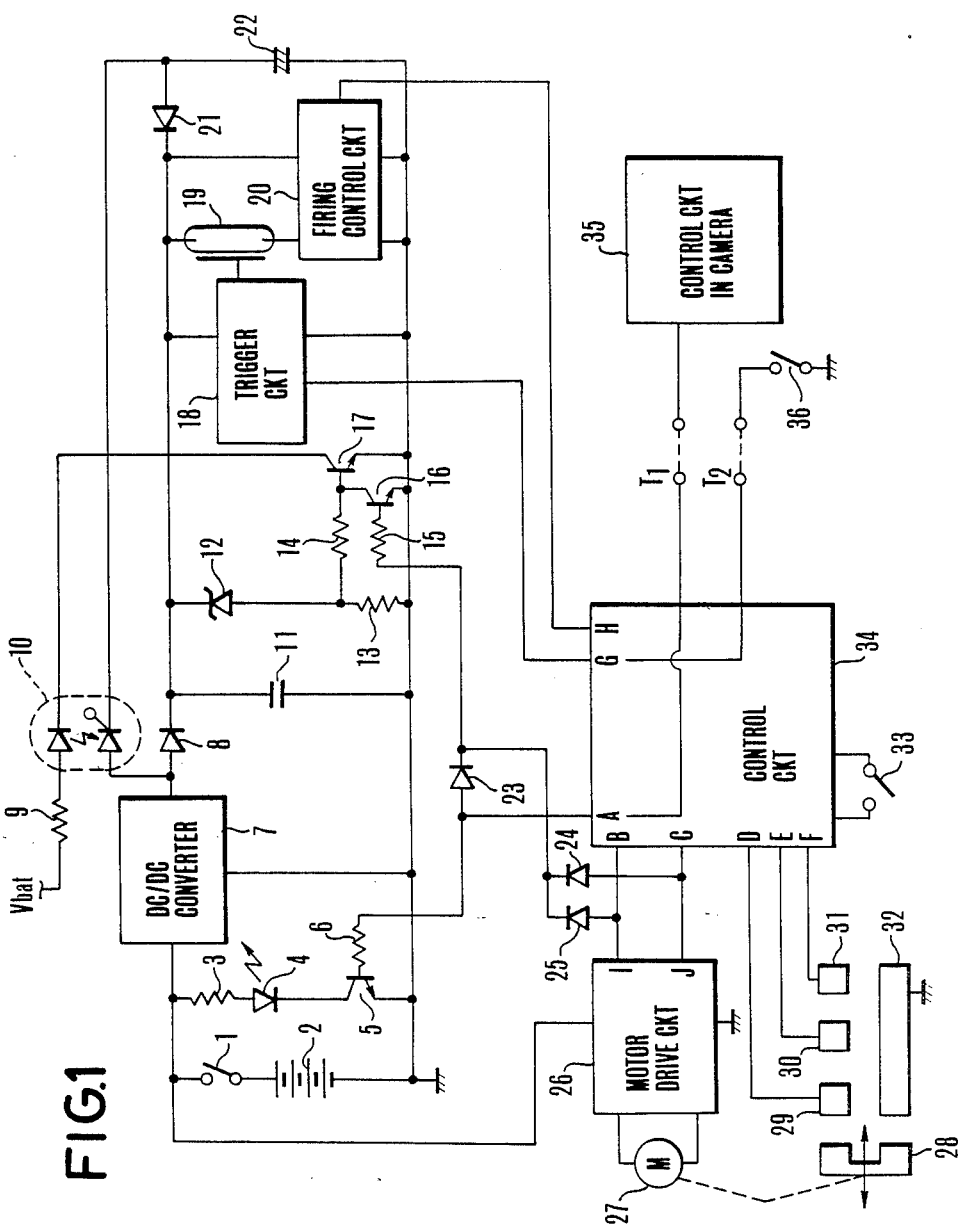
FIG. 1 is an electrical circuit diagram of an embodiment of the electronic flash unit according to the present invention.

FIG. 1 is an electrical circuit diagram illustrating one embodiment of the invention. The circuit includes a power switch 1, an electrical power source or battery 2 for producing a voltage Vbat, a current limiting resistor 3, an LED 4 as a source for auxiliary light when in AF, a transistor 5, a resistor 6, a DC/DC converter 7 as the battery voltage booster, a high voltage rectifier or diode 8, a resistor 9, a photo-coupler 10 comprising a photo-diode and photo-thyristor, a capacitor 11 of small capacitance which can be fully charged for a very short time, a Zener diode 12 which becomes conducting at a time when the voltage on the capacitor 11 reaches a sufficiently high level to fire a flash discharge tube 19, resistors 13, 14 and 15, transistors 16 and 17, a trigger circuit 18 of known construction, a firing control circuit 20 of known construction including a commutation circuit, a diode 21, a capacitor 22 of large capacitance for storing electrical energy to be convertible to light, and diodes 23, 24 and 25.

A motor drive circuit 26 is constructed with a bridge circuit of known construction and others. When a voltage of "1" (for the high level) is applied to an input terminal I, a motor 27 is caused to rotate in the normal direction. When the voltage of "1" is applied to another input terminal J, the direction is reversed. When both input terminals are of "0" (for the low level), the rotation of the motor 27 is stopped. The motor 27 drives a link mechanism for varying the interval between a Fresnel lens arranged in front of a firing portion of an electronic flash unit (not shown) and a flash tube. A brush 28 is fixedly mounted on, for example, a support member of the Fresnel lens which moves as the motor 27 rotates, and cooperates with patterns 29, 30, 31 and 32.

Figure 4:
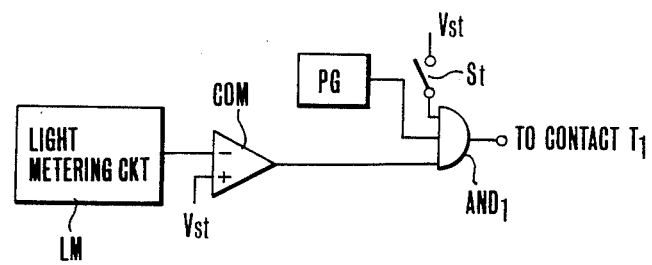
FIG. 4 is an electrical circuit diagram of the construction of part of the control circuit 35 of FIG. 1.

The parts 28 to 32 constitute a zoom position detector. 33 is a zoom position shaft control switch. A control circuit 34 has functions of forming an actuating signal for the LED, a firing control signal and zoom position detecting and motor control signals. The camera has a control circuit 35 constructed as shown in FIG. 4 with inclusion of an LED actuating signal forming circuit comprising a light metering circuit LM, a comparator COM, a pulse generator or oscillator PG and an AND gate $AND_1$. 36 is a synchronizing contact; $T_1$ and $T_2$ are contacts to contact with the camera. The contact $T_1$ receives the output of the above-described control circuit 35 in the camera, or the signal representing the command for emission of the auxiliary light, and the contact $T_2$ receives a signal representing the command for firing the flash tube 19.

At first, the normal operation is described. When the power switch 1 is turned on, the DC/DC converter 7 works to boost the battery voltage Vbat and charging of the capacitor 11 is first started. When the voltage stored on the capacitor 11 reaches a prescribed level high enough to fire the flash discharge tube 19, the Zener diode 12 turns on to supply base current to the transistor 17 through the resistor 14. Hence the transistor 17 turns on. Then, current flows through the resistor 9 to the photo-diode of the photo-coupler 10. Thereby the photo-diode is lighted on, and the photo-thyristor is turned on. Then, the boosted voltage from the DC/DC converter 7 is applied for now across both poles of the main capacitor 22. Thus, charging of the main capacitor 22 is started.

Figure 2:
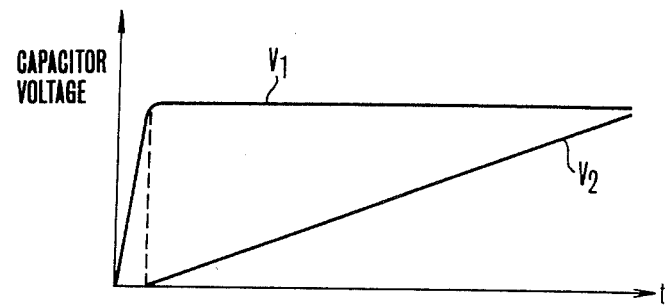
FIG. 2 is waveforms illustrating how the capacitors of FIG. 1 are being charged.

Here, although it is at full length that the capacitors 11 and 22 are capable of being charged to voltages $V_1$ and $V_2$ respectively which are almost equal to each other, $V_1 > V_2$ holds for the early stage of charging. This permits the diode 21 to hinder the charge on the capacitor 11 from being transferred to the main capacitor 22. Also, the required capacitance for the capacitor 11 is usually far smaller than that of the capacitor 22, provided the fully charged capacitor 11 is able to trigger the flash tube, (taking a value high enough to induce electron avalanche in the flash tube so that, despite the charge stored on the capacitor 22 is not sufficient, its energy can then be utilized to fire). Therefore, it takes no long time to fully charge the capacitor 11. As for the ratio of the capacitances of the capacitors 11 and 22, a value of 1:1000 or thereabout is sufficient. For this value, if the charging time of the capacitor 22 is on the order of several seconds, the full charging of the capacitor 11 will not take a longer time than several milliseconds. How the voltages on the capacitors 11 and 22 vary with time after the power switch 1 has been thrown is illustrated in FIG. 2.

Now assuming that the amount of charge stored on the capacitor 22 takes a certain value when the synchronizing contact 36 is closed. The signal representing the command for firing is given from the camera to the control circuit 34 in the flash unit through the contact $T_2$. Responsive to this, the control circuit 34 produces a trigger signal at the output terminal G thereof. The trigger circuit 18 then operates to fire the flash discharge tube 19. For this time, the voltage of the capacitor 11 of small capacitance which is high enough for the flash discharge tube 19 to glow is applied across its anode and cathode. After the start of firing by the energy of the capacitor 11, the energy of the capacitor 22 of large capacitance is supplied through the diode 21. Hence, a sufficient amount of flash light to make the proper flash exposure is obtained. After that, when the amount of integrated flash light from the fired flash discharge tube 19 has reached a level that is equivalent to the proper flash exposure, the control circuit 34 produces a firing stop signal at the output terminal H. Responsive to this, the firing control circuit 20 initiates a commutating operation known to those skilled in the art, and the firing of the flash discharge tube 19 stops.

Next described is another case where the control circuit 35 of the camera sends a signal representing the command for emitting the auxiliary light to the unit through the contact $T_1$. When this signal enters the control circuit 34, it produces a signal of "1" at the output terminal A, causing supply of base current to the transistor 5 through the resistor 6. Thereby the transistor 5 is turned on to supply current to the LED 4 for AF. Hence, the LED 4 emits light. Also, since, at this time, the transistor 16 is supplied with base current through the diode 23 and the resistor 15, the transistor 16 turns on, and the transistor 17 turns off. Thus, current no longer flows to the photo-diode of the photo-coupler 10 and the photo-thyristor is hindered from turning on. Hence, during the time when the LED 4 is being energized, the capacitor 22 of large capacitance is prohibited from being charged, regardless of whether the voltage stored on the capacitor 11 is high or low.

Figure 3:
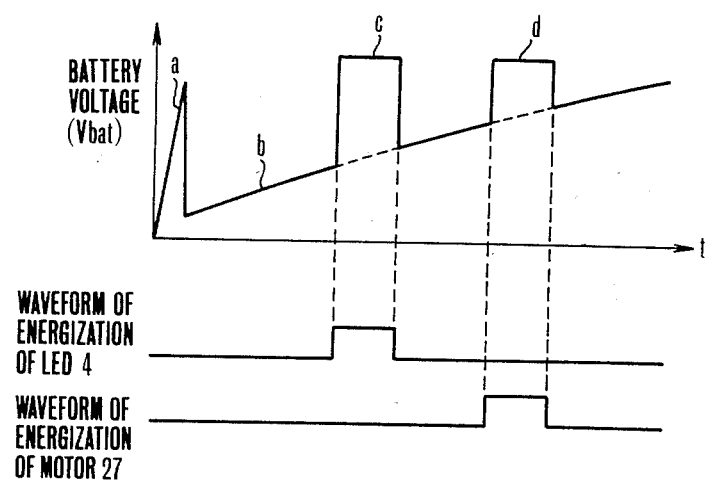
FIG. 3 is a chart taken to explain how the battery voltage changes when the load is driven.

What has been described above is explained in connection with the battery voltage Vbat by using FIG. 3. During the charging operation of the capacitor 22, the DC/DC converter 7 pulls down the actual battery voltage Vbat considerably from the value that is taken when no load is laid on the battery 2, as shown by a line, b, of FIG. 3. If the command for energizing the LED 4 from the camera occurs at a time during the charging operation, the actual battery voltage Vbat, because of its being very low, could not energize the above-described LED 4 to high brilliance. In the embodiment of FIG. 1, on the other hand, the charging of the capacitor 22 is made interrupted at that time, the actual battery voltage Vbat suddenly rises up as shown by a line, c, of FIG. 3, permitting the brilliance of the energized LED 4 to increase to the desired level. For note, the command of energizing the LED 4 appears when the ambient illumination is lower than a prescribed value sensed by comparing the output of the light metering circuit LM of FIG. 4 with a constant voltage Vst, and is in the form of such a pulse signal as shown in FIG. 3 obtained from the pulse oscillator PG through the gate $AND_1$. Also, a switch St of FIG. 4 is arranged to be turned on between a first operation of the camera and a second or release operation. Hence, the above-described energization of the LED 4 is carried out before the release operation. Also, another curve, a, of FIG. 3 represents the variation of the battery voltage Vbat during the charging of the capacitor 11.

Next described is another case where an actuation is done to alter the flash projection angle. Each time the switch 33 is once pushed down, the control circuit 34 produces a signal of "1" at the output terminal B which is applied to the motor drive circuit 26. The motor 27 then rotates in the normal direction, while linearly moving, for example, a Fresnel lens until the flash projection angle changes one step. In more detail, suppose the Fresnel lens is in the initial position for a range of angles of projection equivalent to the angular coverage of 28 mm lens for the 35 mm format of film as when the battery is thrown. Each time the pushing of the switch 33 is recycled, it changes to 50 mm and then to 80 mm. The thus-changing position of the Fresnel lens is detected by which of the patterns 29-31 is in conduction with the common pattern 32 as the brush 28 on the Fresnel lens support moves along both of an array of the patterns 29-31 and the pattern 32. When the Fresnel lens has reached one of these discrete positions, the control circuit 34 detects it and stops the production of the signal of "1" from the output terminal B. For note, it is assumed here that the arrangement is such that for the normal direction of rotation of the motor 27, each time the switch 33 is pushed down, the brush 28 comes across the pattern 29→30→31. After having reached the last pattern 31, the brush 28 no longer advances in the same direction. On this account, the control circuit 34 is made so constructed that when the next pushing of the switch 33 is detected, the above-described output terminal B changes its signal to "0", and, instead, another output terminal C changes its signal to "1", thereby the motor 27 is rotated in the reversed direction to bring the brush 28 into contact with the pattern 30. Then, when the switch 33 is pushed down again, it moves to the pattern 29. Such a construction and arrangement may be modified so that the single switch 33 is replaced by shift-up and shift-down switches and the selection of the output terminals B and C for production of the signal of "1" is controlled according to which shift switch is operated.

Also, in a situation that there is need to use the motor for such purposes, the diode 25 or 24 responsive to the output signal of "1" from the terminal B or C of the control circuit 34 respectively supplies base current to the transistor 16 through the resistor 15, thereby the transistor 16 is turned on. Therefore, similarly to the case that the command for energizing the LED 4 for AF is given as has been described above, the transistor 17 then turns off. So, the photo-diode of the photo-coupler 10 is no longer supplied with current to light it on, and, regardless of whether the capacitor 11 is charged so high as to permit charging of the capacitor 22 of large capacitance, the photo-thyristor prohibits the capacitor 22 from being charged for the time during which the motor 27 is energized. Hence, the energization of the motor 27 is no sooner started than the battery 2 regains the initial value of the voltage Vbat as shown by a line, d, of FIG. 3. Thus, the stabilization of the rotation of the motor 27 can be assured.

According to this embodiment, by taking into account the fact that the actual voltage of the battery 2 considerably drops during the charging of the capacitor 22 of large capacitance, and, it is improper to operate the motor 27 or the LED 4 at the same time (if the motor 27 is allowed to operate at the same time, it could not be driven and the projection angle could not be set to the proper one of the values, and further the charging time of the capacitor 22 would be prolonged), the charging of the capacitor 22 is made stopped in such a situation. This makes it possible to perform the normal driving or the motor 27 when used to alter the projection angle, or the 4 when used to AF.

Also, during this time, the charging of the capacitor 11 of small capacitance is allowed to go on. Hence, even if the charging of the capacitor 22 is not completed at the beginning of that time, any amount of charge which has so far been stored thereon can be utilized to emit flash light. This enables the photographer to take snap shots with the correct flash exposure reliably.

Though this embodiment has been described in connection with the unit having both motor 27 and LED 4, it is understood that the scope of the present invention covers another type of unit having one of them.

Further, the aim of using the motor 27 incorporated in the unit has been assumed to perform the operation of altering the projection angle. But, the present invention is not confined thereto, and is applicable to other types of unit in which that motor is used for another purposes, or the drive source takes a different form than the motor. Also, though the means for actuating the operation of altering the projection angle has been arranged to be manually operable, automatic zoom type of means may otherwise be used to effect altering in response to the focal length of the photographic lens of the camera. Further, the unit has been assumed to incorporate therein the LED 4 for AF as the auxiliary light emitting means. This means may be in the form of a tungsten-filament lamp which is generally used for closeup photography, or the like.

Figure 5:
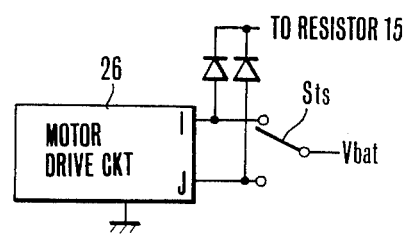
FIG. 5 is an electrical circuit diagram of another practical example of the drive control circuit for the motor 27 of FIG. 1.

Also, as the circuit for controlling the reversible operation of the motor 27, another form of a drive circuit 26 may be used as shown in FIG. 5 with its inputs I and J connected to the outputs of a manually operable switch Sts so that the driving of the motor for moving the Fresnel lens is maintained during the time when the switch Sts is operated.

Further, though, as the auxiliary light for AF, the LED 4 has been used, the tungsten-filament lamp may be used instead.

As has been described above, according to the present invention, the electronic flash unit is provided with the load priority means responsive to driving of a load for rendering the charging control means to forcibly inhibit the charging of the storage capacitor, thereby giving an advantage that owing to the precedence of the driving of the load over the charging of the storage capacitor, the quickness of snap shots can be preserved, and, despite its electrical power source is common with the capacitor, good stability of operation of the load can be assured.

What is claimed is:

1. A flash photographic system using an electronic flash unit having capacitor means to be charged with the output of an electrical power source circuit and a flash tube for emitting flash light by discharging the charge stored on said capacitor means, therethrough comprising:
   (a) load means to be driven by the output of said electrical power source circuit;
   (b) first and second capacitors constituting said capacitor means, the capacitance of said first capacitor being set to a small value compared with the capacitance of said second capacitor, and both of said capacitors being charged with the output of said electrical power source circuit;
   (c) inhibiting means for inhibiting said second capacitor from being charged with the output of said electrical power source circuit under the condition that the charging of said first capacitor with the output of said electrical power source circuit is maintained; and (d) drive means for driving said load means by the output of said electrical power source circuit, said inhibiting means operating to inhibit charging of said second capacitor during the time when said load operates by said drive means.

2. A system according to claim 1, wherein said inhibiting means includes switching means arranged in a charging path between the output of said electrical power source circuit and said second capacitor, and said switching means turns off during the time when said load is driven.

3. A system according to claim 1 or 2, wherein said electronic flash unit includes voltage detecting means for detecting the voltage stored on said first capacitor upon attainment of said stored voltage to a prescribed value to produce an output, and charging control means responsive to the output of said voltage detecting means for causing said second capacitor to be charged.

4. A system according to one of claims 2, wherein said load means is an electric motor.

5. A system according to one of claims 2, wherein said load means is light projecting means.

6. A flash photographic system using an electronic flash unit having capacitor means to be charged with the output of a voltage boosting circuit for boosting the output of a battery and a flash tube for emitting flash light by discharging the stored voltage on said capacitor means therethrough, comprising:
    (a) load means to be driven by the output of said battery;
    (b) first and second capacitors constituting said capacitor means, the capacitance of said first capacitor being set to a small value compared with the capacitance of said second capacitor, said first capacitor being connected to said boosting circuit, and said second capacitor being connected through switching means to said boosting circuit; and
    (c) a drive signal forming circuit for producing a drive signal for driving said load means by the output of said battery, said switching means being turned off in response to said drive signal.

7. A system according to claim 6, wherein said electronic flash unit includes voltage detecting means for detecting the voltage stored on said first capacitor upon attainment of said stored voltage to a prescribed value to produce an output, and said switching means operates in such a manner that it turns on in response to the output of said voltage detecting means, thereby a charging of said second capacitor is started, and, when said drive signal appears at a time during the charging, it turns off to inhibit the charging of said second capacitor for the time of driving said load.

8. A flash device comprising:
    (a) an electrical power source circuit
    (b) capacitor means including first and second capacitors, the capacitance of said first capacitor being set to a small value compared with the capacitance of said second capacitor, and both of said capacitors being charged with the output of said electrical power source circuit
    (c) flash tube for emitting flash light by discharging the charge stored on said capacitor means
    (d) inhibiting means for inhibiting said second capacitor from being charged during the time when load means to be driven by the output of said electrical power source circuit is in driven states.

9. A flash device according to claim 8, wherein said inhibiting means is formed by switching means, and said first capacitor is connected to an electrical power source without through said switching means while said second capacitor is connected to the electrical power source through said switching means.

* * * * *